July 18, 1961 P. ROBINSON 2,993,156
CAPACITOR DIELECTRIC
Filed May 24, 1956
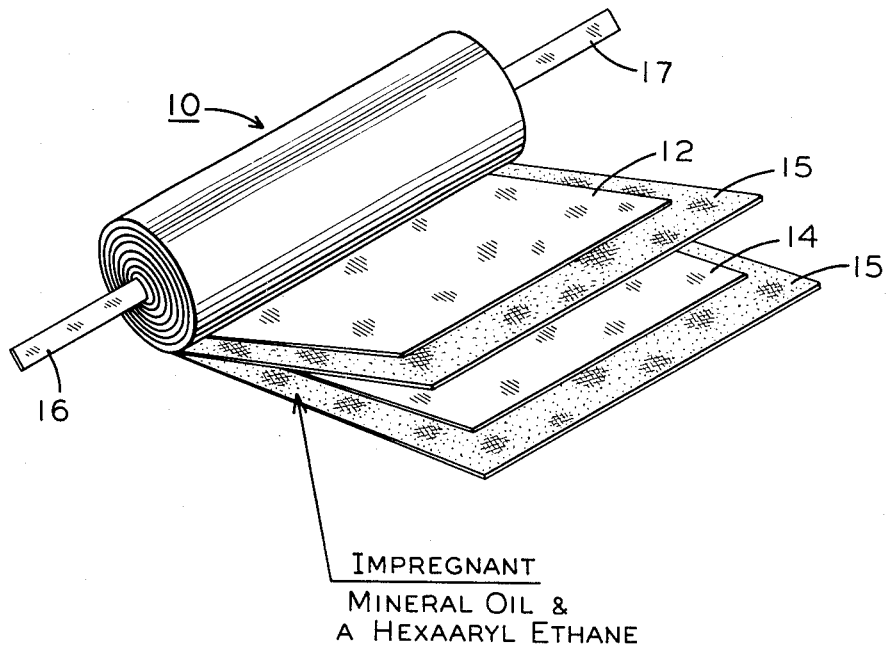
IMPREGNANT
MINERAL OIL &
A HEXAARYL ETHANE
PRESTON ROBINSON
*INVENTOR.*
BY *Connolly and Hutz*
HIS ATTORNEYS

United States Patent Office 2,993,156
Patented July 18, 1961

2,993,156
CAPACITOR DIELECTRIC
Preston Robinson, Williamstown, Mass., assignor to Sprague Electric Company, North Adams, Mass., a corporation of Massachusetts
Filed May 24, 1956, Ser. No. 587,140
1 Claim. (Cl. 317—259)

The present invention relates to a new and improved type of dielectric composition. More specifically, it relates to a dielectric composition which is particularly useful with electrostatic capacitors.

This application is a continuation-in-part of my co-pending United States patent application, Serial No. 362,131, filed June 16, 1953, and now abandoned.

At the present time, a very high percentage of the electrostatic capacitors manufactured are formed as convolutely wound units in which electrode foils are separated from one another by a porous spacer impregnated with a dielectric composition. Because of its cheapness, its high dielectric constant, as well as its comparatively high leakage resistance, a common dielectric employed is purified mineral oil. This dielectric serves quite effectively in such units until such time as there occurs sparking or corona between the electrodes of the capacitor. At this point, the leakage resistance of the oil drops to a substantial extent, and as a rule, the life of the condenser is then limited because of the degradation products within the oil composition. As a means of preventing this dielectric degradation, all sorts of nitroso compounds, azo compounds, nitro compounds and the like have been suggested as inhibitors to be incorporated within mineral oil. The fact that none of these inhibitors is completely successful in adequately prolonging the life of this dielectric is quite readily illustrated by the fact that continued research of the development on the subject is being carried out with undiminished vigor by practically every manufacturer of capacitors throughout the United States. Further, merely adding these inhibitors generally degrades the electrical character of the dielectric particularly the resistivity.

It is an object of the present invention to produce a new and improved type of mineral oil dielectric composition. A further object is to produce a dielectric composition based upon mineral oil and comparable liquid hydrocarbons which is more effective than the compositions indicated in the above discussion of the prior art. These and other objects of the invention, as well as the advantages of it, will be apparent from the body of this specification, the appended claim and the sole figure of a partially unwound capacitor section.

In general, the above aims are achieved by incorporating a small percentage of a compound which readily dissociates so as to yield stable organic free radicals into a highly purified mineral oil composition. Obviously, a number of compounds that do not degrade the dielectric nature of the novel composition, for example pour point depressants, can be used as secondary ingredients within the scope of the present disclosure.

Thus in its broadest concept my invention encompasses a dielectric impregnant of a liquid hydrocarbon modified by the additon of a minor amount of a compound that dissociates in said hydrocarbon to produce stable free radicals.

Free radicals are neutral molecules, which, unlike ions, do not possess a charge. The dissociation of a compound such as an hexaarylethane is a non-ionic process in which the shared pair of electrons between the ethane-carbon atoms becomes divided equally between the two radicals, a process similar to the formation of two neutral atoms from a diatomic molecule. It is not within the scope of my invention to include all compounds capable of dissociation to produce free radicals, but only those that produce stable free radicals. By stable is meant that the free radicals are lasting and have durability, particularly life times approaching that of the operational life of the capacitor. Unstable free radicals conversely have short lifetimes, that is of the order seconds to milliseconds, as for example, the ethyl free radical has a half life of about 0.006 second as does also the free benzyl radical. Suitable compounds that in dissociated form are stable free radicals can be classified as follows with representative materials set forth thereafter:

Hexa aryl ethanes

Hexaphenylethane which dissociates to triphenylmethyl; tetraphenyl di(p-anisyl)methyl; tetraphenyl di(o-anisyl)-ethane which dissociates to diphenyl-o-anisyl methyl; tetraphenyl di($\alpha$-naphthyl)ethane which dissociates to diphenyl-$\alpha$-naphthyl methyl; hexa-o-anisyl ethane which dissociates to tri-o-anisyl methyl; bis-(phenyl-p-biphenyl-$\alpha$-naphthyl)ethane which dissociates to phenyl-p-biphenyl)-ethane which dissociates to diphenyl-p-biphenyl methyl; bis-(phenyl-di-p-biphenyl)ethane which dissociates to phenyl-di-p-biphenyl methyl; hexa-p-biphenyl ethane which in dissociated form is tri-p-biphenyl methyl.

Tetra aryl dialkyl ethanes

Sym tetraphenyl-di-tert-butylethane which dissociates into diphenyl-t-butyl methyl; sym tetra-p-biphenyl-di-tert-butyethane which dissociates into di-p-biphenyl-tert-butyl methyl.

Deca aryl butanes

Deca phenyl butane which in dissociated form is penta phenyl ethyl;

Poly aryl alkenes 1,1,3,3,4,4,6,6-octophenyl hexadiene-1,5 which in dissociated form is 1,1,3,3, - tetraphenyl allyl; 1,1,6,6 - tetraphenyl-3,3,4,4-tetra-p-anisyl hexadiene-1,5 which in dissociated form is 1,1-di-p-anisyl-3,3-diphenyl allyl; 1,1,4,5,8,8-hexaphenyl-4,5-di($\beta,\beta$-diphenyl vinyl)octadiene - 1,7 which in dissociated form is diphenyl di-($\beta,\beta$-di-phenyl vinyl)-methyl; 1,1,6,6-tetraphenyl - 3,3,4,4 - tetra($\beta,\beta$-diphenyl vinyl)hexadiene-1,5 which in dissociated form is tri($\beta,\beta$-diphenyl vinyl)-methyl; 1,1,6,6-tetraphenyl-3,4-di-($\beta,\beta$-di-phenyl vinyl)hexadiene 1,5 which in dissociated form is di-($\beta,\beta$-diphenyl vinyl)-methyl.

Hexa aryl tetrazanes 1,1,4,4 - tetraphenyl - 2,3 - di($\beta$ - 2,4,6 - trinitrophenyl) tetrazane which in dissociated form is $\alpha,\alpha$-diphenyl-$\beta$-2,4,6-trinitro phenyl hydrazyl; 1,1,4,4-bis(p-anisyl)-2,3-di(benzoyl)tetrazane which in dissociated form is $\alpha,\alpha$-di-p-anisyl-$\beta$-benzoyl hydrazyl.

Diaryl peroxides

Bis-(9-methoxy-10-phenanthryl)-peroxide which in dissociated form is 9-methoxy-10-phenanthroxy; bis-(9-ethoxy-10-phenanthryl)-peroxide which in dissociated form is 9-ethoxy-10-phenanthryl.

The above recitation of compounds which dissociate into stable free radicals is merely representative of the scope of the invention. Application of this invention in its preferred form is to the hexa aryl ethane class and to the poly aryl alkenes, particularly the latter as have present in their structure $\alpha,\beta,\beta$ diphenyl vinyl grouping that for a reason not fully explainable provokes remarkable stabilization of the dielectric oil.

The term mineral oil as used herein is intended to designate any one of a number of substantially pure hydrocarbon oils derived from petroleum or synthetically produced. Many of these compositions are not in and of themselves a pure "fraction" containing only a single compound, but instead, contain a plurality of different molecular ingredients, and may include materials which melt above room temperature. The hydrocarbon oils include both saturated and unsaturated materials. Thus it is within the concept of this invention to stabilize polyisobutylene impregnants which are synthetically produced hydrocarbons in contrast to those natural occurring hydrocarbons obtained from petroleum. Polyisobutylene impregnants include both the homopolymer and copolymers of isobutylene. An exceptional polyisobutylene type of dielectric impregnant is that described in the Robinson Patent No. 2,711,498 issued June 21, 1955. Other polyisobutylene impregnants are taught in the Bannon Patent No. 2,274,031 issued February 24, 1942, which teaches of polymers arising out of the polymerization of the dimer, trimer or higher molecular weight polymers of isobutylene and in the Harmon United States Patent No. 2,151,382 issued March 21, 1939, which recites copolymers of isobutylene in which a diolefin as butadiene-1,3 may be present in amounts up to 50% by weight of the mixture. Thus, the term as broadly used includes both linear and branch chained aliphatic natural and synthetically produced hydrocarbons.

In general, any of the additives indicated above may be admixed with mineral oil in a range of from $1/10$ to 10% by weight, although for preferred results, it is best to use from between about $1/10$ to 4% of the additives indicated above. The precise additive used for any given application will vary slightly depending upon the temperature at which the resultant capacitance unit is designed to be used. In order to obtain the advantages of the invention, free radicals must be formed by dissociation within the mineral oil whenever the total dielectric composition is under conditions of either heat and/or electrical stress.

Reference should now be made to the single figure of the appended drawing which shows a partially unwound capacitor section in which the stabilized dielectric of the invention is used as the impregnant. This convolutely wound capacitor section 10 comprises two electrode foils 12 and 14 separated by dielectric spacer material 15. Such a capacitor section preferably consists of aluminum foil separated by thin calendered kraft paper dielectric spacer material. Flat, metallic flexible electrically conducting tabs 16 and 17 are wound into the capacitor section so as to electrically contact their respective capacitor electrodes and so as to extend from the opposite ends of the section 10. The section which is impregnated after incorporation into a housing of any of the well-known types for electrostatic capacitors, has its electrodes connected to the respective terminals of the housing by means of the tabs 16 and 17. The novel dielectric compositions taught herein are introduced into the capacitor section by vacuum impregnation methods well-known to the art.

The precise means by which the new invention herein disclosed operates is not completely known to me at the present time, and naturally, for this reason, I do not desire to be bound by any particular theory of operation. However, it appears that when corona occurs between the electrodes of a mineral oil impregnated electrostatic capacitor, at least part of the mineral oil in the vicinity of the discharge is broken down into radical dimerization products which in turn tend to unite with one another forming both more complex and less complex hydrocarbon substituents possessing less advantageous dielectric characteristics than the initial molecules present. Further, electrical discharge as indicated above tends to create small areas of what I prefer to refer to as cryptocrystalline carbon particles which tend to lower the leakage resistance of an electrode in an electrostatic unit. Such particles of carbon are so small that their presence cannot readily be detected by microscope and/or the usual analytical procedures. It is thought that in the operation of the invention that the free radicals present within the dielectric at the moment of an electrical discharge immediately react with those radicals which may be produced by the decomposition of the aliphatic hydrocarbon chains, and with any cryptocrystalline carbon which may be formed as indicated above.

The capacitor of the construction illustrated in the appended drawing is impregnated with a stabilized dielectric composition in accordance with the teachings of this invention. The capacitor section consists of two superimposed aluminum foils 0.25 mil thick and 1.5 inches wide, separated by 2 layers of 0.4 mil thick and 1.75 inches wide calendered kraft paper having a density of about 1.0. This capacitor unit is rated at 1.0 mfd. capacity and 600 volts D.C. operational voltage. The impregnant, introduced by conventional vacuum techniques at a temperature of 85° C., consists of 2% by weight of 1,1,6,6-tetraphenyl-1,3,3,4,4-tetra-p-anisyl hexadient-1,5 dissolved in Sun XXX mineral oil. This unit is characterized by much extended life under exceptional voltage stress and elevated temperatures.

Further examples indicative of the practice of this invention include dielectric systems impregnated into the above capacitor construction in which the respective dielectrics are as follows:

(1) The unsaturated linear oily copolymer of a mixture of isobutylene and 5% by weight of butadiene-1,3, said polymer having an average molecular weight of 1200, a viscosity of 125,000 Saybolt-seconds-units at 100° F. and an iodine number of 40 as determined by Wijs' method, is admixed with 1% by weight of 1,1,4,4-tetraphenyl-2,3-di($\beta$-2,4,6-trinitrophenyl) tetrazene in its dissociated form as $\alpha,\alpha$-diphenyl-$\beta$-2,4,6-trinitrophenyl hydrazyl.

(2) Mineral oil having a flash point of 507° F. admixed with 4% by weight of hexaphenylethane.

(3) Liquid polyisobutylene having an average molecular weight of about 3000 admixed with .1% by weight symmetrical tetraphenyl-di-tertiary-butyl ethane.

(4) Mineral oil having a viscosity of 500 cps. at 25° C. admixed with 0.5% by weight of decaphenylbutane in its dissociated form as tetraphenylethyl.

(5) An oily homopolymer of diisobutylene catalyzed by aqueous boron trifluoride, having an iodine number of 50 as determined by Wijs' method, a flash point of 290° F. and an average molecular weight of about 1100, admixed with 3% by weight of bis-(o-methoxy-10-phenanthryl)-peroxide in its dissociated form as 9-methoxy-10-phenanthroxy.

It is thus apparent that the stabilizing action is obtained from the presence of the stable free radicals in the dielectric system. In contrast those materials which dissociate into unstable short lived free radicals are unsuitable as stabilizers as these unstable free radicals will not be present in the dielectric material when the degradation of the hydrocarbon occurs either through fracture of the carbon-to-carbon bonds in the hydrocarbon molecule or through dehydrogenation of the molecule as they have rapidly dissipated themselves. Further with these unstable free radicals particularly those from the metallic alkyls such as lead tetraethyl, the energy associated with the creation of the free radical is so high that instead of combining with the degradation products arising out of the combined effect of heat and electrical stress of the dielectric, the generated free radicals continue to degrade the hydrocarbon by depolymerization of the dielectric and bringing about rapid breakdown of the electrostatic capacitor. Also such unstable free radicals as methyl, ethyl, phenyl react with other elements of the capacitor structure to the electrical degradation of the component. The lead tetraalkyls should also be avoided because of their toxicity in extremely small concentrations which would be dangerous to both the users of the component and the manufacturing personnel.

The preferred additives of the invention as indicated above which are characterized by the molecular unsaturation of the polyarylalkenes and the unique stability of the hexaarylethanes possess the advantages discussed in the preceding paragraph, and in addition, are extremely desirable because the unsaturated linkage with the radicals formed tends to react with any halide ions which may be present due to handling or the like, preventing such ions from attacking the electrodes of a capacitor in the known manner through the formation of hydrogen chloride by scintillation as well as effectively preventing continued degradation of the hydrocarbon dielectric by reaction with the degradation products.

Those skilled in the art will realize that the instant invention is much broader than the specific compounds discussed and many equivalent compounds can, of course, be located by referring to chemical literature. The use of such related compounds, as well as other similar modifications of the invention, is to be considered as part of the instant inventive concept insofar as such uses are included within the scope of the appended claim.

I claim:

A capacitor containing electrode foils separated by a porous spacer impregnated with a mineral oil containing about 0.1% to 10% by weight of a hexaaryl ethane dissociated in said oil to produce free radicals, said free radicals being stable at temperatures in excess of 85° C. and having lifetimes approaching that of the operational life of the capacitor.

References Cited in the file of this patent

UNITED STATES PATENTS

| | | |
|---|---|---|
| 1,857,761 | McCabe | May 10, 1932 |
| 2,377,630 | Hyde | June 5, 1945 |
| 2,473,242 | Clark | June 14, 1949 |

OTHER REFERENCES

Basseches: Ind. and Eng. Chem., September 1955, vol. 47, No. 9, pages 1782–1794. (Copy in Library.)